(12) United States Patent
Lee et al.

(10) Patent No.: US 8,803,988 B2
(45) Date of Patent: Aug. 12, 2014

(54) COMPUTING DEVICE AND METHOD OF CONTROLLING IMAGE CAPTURING DEVICE

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 245 days.

(21) Appl. No.: 13/313,009

(22) Filed: Dec. 7, 2011

(65) Prior Publication Data

US 2013/0100300 A1 Apr. 25, 2013

(30) Foreign Application Priority Data

Oct. 24, 2011 (TW) .................................. 100138504

(51) Int. Cl.
*H04N 5/232* (2006.01)
(52) U.S. Cl.
USPC ................ 348/211.9; 348/14.09; 348/211.12
(58) Field of Classification Search
CPC ................................................ H04N 5/23225
USPC ........ 348/211.99, 211.1, 211.4, 211.9, 14.08, 348/14.09, 14.1
See application file for complete search history.

(56) References Cited

U.S. PATENT DOCUMENTS

| 5,757,424 A * | 5/1998 | Frederick .................... 348/218.1 |
| 6,275,258 B1 * | 8/2001 | Chim ........................ 348/211.12 |
| 2009/0201313 A1 * | 8/2009 | Thorn ........................... 345/620 |

\* cited by examiner

*Primary Examiner* — Tuan Ho
(74) *Attorney, Agent, or Firm* — Novak Druce Connolly Bove + Quigg LLP

(57) ABSTRACT

In a method of controlling an image capturing device using a computing device, sounds coming from a monitored area are detected in real-time using sound receivers that are electronically connected to the computing device. The detected sounds are analyzed using an acoustic source localization (ASL) device of the computing device to determine the direction of the apparent origin of the detected sounds in the monitored area. A command is sent to the image capturing device to view or focus on the origin of the sounds in the monitored area. The computing device controls a lens of the image capturing device to capture images of the source of the sounds in the monitored area.

9 Claims, 3 Drawing Sheets

COMPUTING DEVICE AND METHOD OF CONTROLLING IMAGE CAPTURING DEVICE

BACKGROUND

1. Technical Field

Embodiments of the present disclosure relate generally to surveillance technologies and particularly to a computing device and method for controlling an image capturing device in a video surveillance system.

2. Description of Related Art

Image capturing devices are used in video surveillance systems to monitor areas requiring security. In some cases, the image capturing device is manually operated to pan or tilt, to capture images within a monitored area. However, it is inconvenient for an operator to adjust the image capturing device in this way. In addition, the image capturing device may be powered to regularly pan and tilt unceasingly to capture images within the monitored area, but this uses much power and may not capture important activities happening in the monitored area in real-time.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
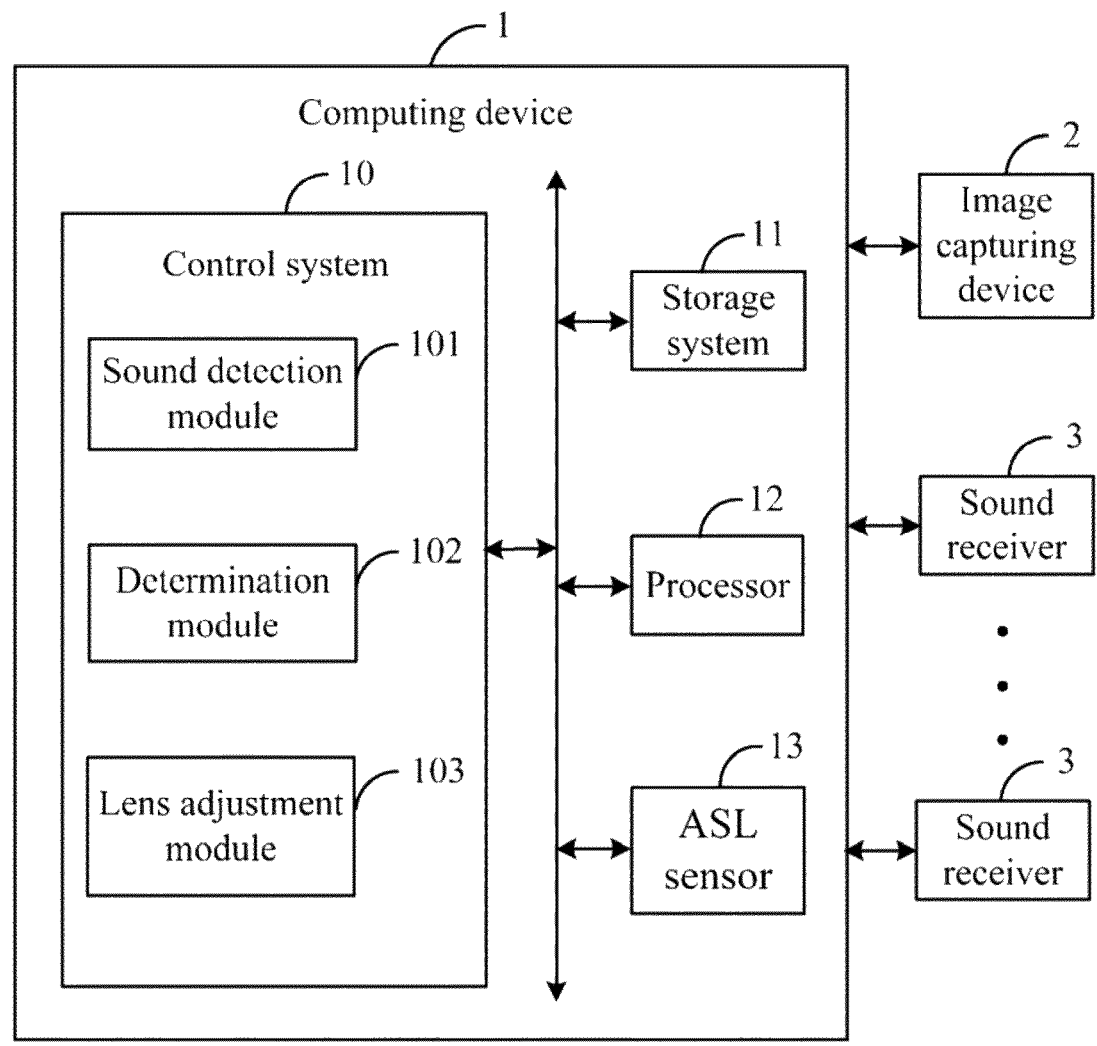
FIG. 1 is a schematic diagram illustrating one embodiment of a computing device including a control system.

FIG. 1 is a schematic diagram illustrating one embodiment of a computing device 1 including a control system 10. In the embodiment, the computing device 1 further includes a storage system 11, a processor 12, and an acoustic source localization (ASL) device 13. The computing device 1 is electronically connected to an image capturing device 2, and controls the image capturing device 2 to monitor a monitored area by capturing images within the monitored area. The computing device 1 is further electronically connected to a plurality of sound receivers 3, and detects sounds within the monitored area using the sound receivers 3. In one embodiment, the computing device 1 may be, for example, a server or a computer. It is understood that FIG. 1 is only one example of the computing device 1 that can include more or fewer components than those shown in the embodiment, or have a different configuration of the various components.

The image capturing device 2 may be, for example, a speed dome camera or a pan/tilt/zoom (PTZ) camera. In the embodiment, the image capturing device 2 includes at least one driving device, such as a servomotor that can drive the image capturing device 2 and a lens of the image capturing device 2 to pan and tilt towards different directions.

Each of the sound receivers 3 may be a unidirectional microphone for collecting sound sources from a particular direction. In one embodiment, each of the sound receivers 3 may be regularly distributed in the monitored area or mounted around the image capturing device 2, to detect sounds from different directions of the monitored area. The ASL device 13 analyzes the sounds detected by the sound receivers 3 to determine the source of any of the sounds in the monitored area, so that the control system 10 can control the lens of the image capturing device 2 to point to and focus on the source of the sounds and capture images of the apparent sound source within the monitored area.

The control system 10 may include a plurality of programs in the form of one or more computerized instructions stored in the storage system 11 and executed by the processor 12 to perform operations of the computing device 1. In the embodiment, the control system 10 includes a sound detection module 101, a determination module 102, and a lens adjustment module 103. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The sound detection module 101 detects sounds within the monitored area in real-time using each of the sound receivers 3.

Figure 2:
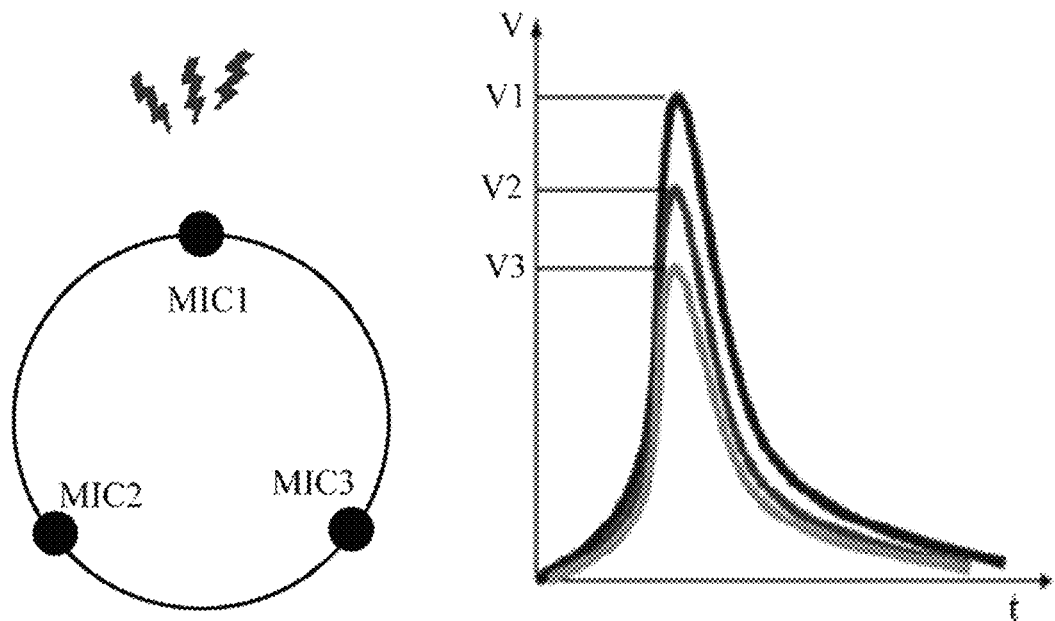
FIG. 2 is a schematic diagram illustrating an example of voltage levels and wave forms converted from sounds obtained by sound receivers of FIG. 1.

The determination module 102 analyzes the detected sounds using the ASL device 13 to determine a direction of the sounds in the monitored area from which the sounds are emanating. In one embodiment, the detected sounds may be analyzed using an amplitude comparison method as follows. First, the determination module 102 inputs the detected sounds received by each of the sound receivers 3 into the ASL device 13. In one example, as shown in FIG. 2, assuming that the computing device 1 is connected to three sound receivers 3, such as MIC 1, MIC 2, and MIC 3, each of the sound receivers 3 may be respectively receiving a set of sounds within the monitored area, and the received sounds may be input into the ASL device 13. Second, the ASL device 13 converts the received sounds of each of the sound receivers 3 into a representation of the voltage (voltage signal) from each sound receiver. For example, the sounds received by MIC 1, MIC 2, and MIC 3 may be respectively converted into the voltage signals V1, V2, and V3 of FIG. 2, where V1 represents a voltage signal of the sounds received by the MIC 1, V2 represents a voltage signal of the sounds received by the MIC 2, and V 3 represents a voltage signal of the sounds received by the MIC 3. Third, the ASL device 13 compares the amplitude of each of the voltage signals to ascertain the direction of the detected sounds in the monitored area by determining the sound receiver 3 which shows the maximum amplitude in the voltage signal. For example, the voltage signal V1 of FIG. 2 has the maximum amplitude, so the direction in which the MIC 1 is pointing is determined as the direction of the detected sounds within the monitored area.

The lens adjustment module 103 generates a control command according to the determined direction of the detected sounds, and sends the control command to the image capturing device 2 to control the lens of the image capturing device 2 to orientate towards the determined direction and capture images within the monitored area. In one embodiment, when the image capturing device 2 receives the control command, the lens of the image capturing device 2 may be driven to move (e.g., pan and tilt) according to the control command using the at least one driving device.

Figure 3:
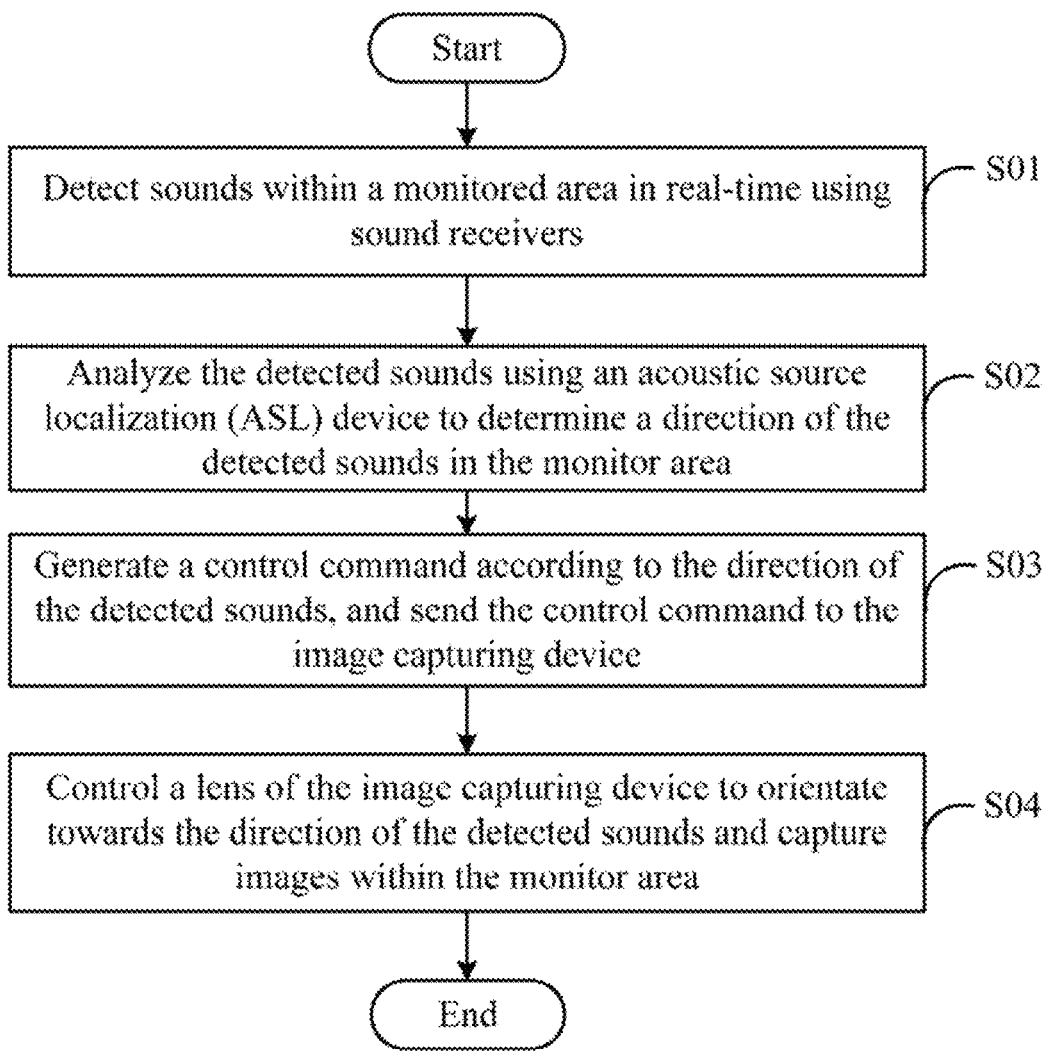
FIG. 3 is a flowchart of one embodiment of a method of controlling an image capturing device using the computing device of FIG. 1.

FIG. 3 is a flowchart of one embodiment of a method for controlling the image capturing device 2 using the computing device 1 of FIG. 1. Depending on the embodiment, additional blocks may be added, others removed, and the ordering of the blocks may be changed.

In block S01, the sound detection module 101 detects sounds within the monitored area in real-time using each of the sound receivers 3.

In block S02, the determination module 102 analyzes the detected sounds to determine the direction from which the detected sounds are emanating in the monitored area using the ASL device 13. The details of analysis in relation to the detected sounds are described above.

In block S03, the lens adjustment module 103 generates a control command according to the direction from which the detected sounds are determined to be emanating, and sends the control command to the image capturing device 2.

In block S04, the lens of the image capturing device 2 is controlled to move (e.g., pan and tilt) and capture images of the apparent origin of the sounds within the monitored area.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method of controlling an image capturing device using a computing device, the computing device being electronically connected to a plurality of sound receivers, the method comprising:
   detecting sounds within a monitored area in real-time using each of the sound receivers;
   analyzing the detected sounds to determine a direction of the sounds in the monitored area using an acoustic source localization (ASL) device of the computing device, wherein the detected sounds are analyzed by inputting the detected sounds received by each of the sound receivers into the ASL device, converting the sounds received by each of the sound receivers into a voltage signal using the ASL device, comparing the amplitude of each of the converted voltage signals, and ascertaining the direction of the detected sounds by determining one of the sound receivers which shows the maximum amplitude in the voltage signal;
   generating a control command according to the direction of the sounds, and sending the control command to the image capturing device; and
   controlling a lens of the image capturing device to orientate towards the determined direction and capture images within the monitored area according to the control command.

2. The method according to claim 1, wherein the sound receiver is a unidirectional microphone.

3. The method according to claim 1, wherein the image capturing device is a speed dome camera or a pan/tilt/zoom (PTZ) camera that includes at least one driving device for driving the lens of the image capturing device to orientate towards the direction of the detected sounds.

4. A computing device for controlling an image capturing device, the computing device being electronically connected to a plurality of sound receivers, the computing device comprising:
   an acoustic source localization (ASL) device;
   a storage system;
   at least one processor;
   one or more programs stored in the storage system and executed by the at least one processor, the one or more programs comprising:
   a sound detection module operable to detect sounds sourced from a monitored area in real-time using each of the sound receivers;
   a determination module operable to analyze the detected sounds to determine a direction of the sounds in the monitored area using the ASL device, wherein the detected sounds are analyzed by inputting the detected sounds received by each of the sound receivers into the ASL device, converting the sounds received by each of the sound receivers into a voltage signal using the ASL device, comparing the amplitude of each of the converted voltage signals, and ascertaining the direction of the detected sounds by determining one of the sound receivers which shows the maximum amplitude in the voltage signal;
   a lens adjustment module operable to generate a control command according to the direction of the sounds, and sending the control command to the image capturing device to control a lens of the image capturing device to orientate towards the determined direction and capture images within the monitored area.

5. The computing device according to claim 4, wherein the sound receiver is a unidirectional microphone.

6. The computing device according to claim 4, wherein the image capturing device is a speed dome camera or a pan/tilt/zoom (PTZ) camera that includes at least one driving device for driving the lens of the image capturing device to move towards the direction of the detected sounds.

7. A non-transitory storage medium storing a set of instructions, the set of instructions capable of being executed by a processor of a computing device, causes the computing device to perform a method of controlling an image capturing device, the computing device being electronically connected to a plurality of sound receivers, the method comprising:
   detecting sounds within a monitored area in real-time using each of the sound receivers;
   analyzing the detected sounds to determine a direction of the sounds in the monitored area using an acoustic source localization (ASL) device of the computing device, wherein the detected sounds are analyzed by inputting the detected sounds received by each of the sound receivers into the ASL device, converting the sounds received by each of the sound receivers into a voltage signal using the ASL device, comparing the amplitude of each of the converted voltage signals, and ascertaining the direction of the detected sounds by determining one of the sound receivers which shows the maximum amplitude in the voltage signal;
   generating a control command according to the direction of the sounds, and sending the control command to the image capturing device; and
   controlling a lens of the image capturing device to orientate towards the determined direction and capture images within the monitored area according to the control command.

8. The non-transitory storage medium according to claim 7, wherein the sound receiver is a unidirectional microphone.

9. The non-transitory storage medium according to claim 7, wherein the image capturing device is a speed dome camera or a pan/tilt/zoom (PTZ) camera that includes at least one driving device for driving the lens of the image capturing device to move towards the direction of the detected sounds.

* * * * *